(12) United States Patent
Cavin et al.

(10) Patent No.: US 10,747,310 B1
(45) Date of Patent: Aug. 18, 2020

(54) TIME OF FLIGHT BASED EYE TRACKER

(71) Applicant: Facebook Technologies, LLC, Menlo Park, CA (US)

(72) Inventors: Robert Dale Cavin, Kirkland, WA (US); Alexander Jobe Fix, Seattle, WA (US); Andrew John Ouderkirk, Redmond, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 16/012,638

(22) Filed: Jun. 19, 2018

(51) Int. Cl.
| | |
|---|---|
| G06F 3/01 | (2006.01) |
| G06T 7/70 | (2017.01) |
| G06T 7/73 | (2017.01) |
| G06T 7/521 | (2017.01) |
| G06T 19/00 | (2011.01) |
| H04N 5/235 | (2006.01) |

(52) U.S. Cl.
CPC ............. G06F 3/013 (2013.01); G06T 7/75 (2017.01); *G06T 7/521* (2017.01); *G06T 19/006* (2013.01); *H04N 5/2354* (2013.01)

(58) Field of Classification Search
CPC .......... G06F 3/013; G06F 3/012; G06F 3/011; G06F 3/01; G06K 9/2027; G06K 9/20; G06K 9/00; G06T 19/006; G06T 7/521; G06T 7/514; G06T 7/50; G06T 7/60; G06T 7/00; G06T 19/00; G06T 19/003; G06T 19/20; G06T 7/75; G06T 7/70; H04N 5/2354; H04N 5/235; H04N 5/225; H04N 5/222; H04N 5/00; G02B 27/017; G02B 27/01; G02B 2027/0132; G02B 7/002

USPC .......... 345/7, 8, 156, 157, 158, 77; 382/103; 351/209, 207, 206, 200; 348/78
See application file for complete search history.

(56) References Cited

U.S. PATENT DOCUMENTS

| | | | | |
|---|---|---|---|---|
| 3,462,604 A | * | 8/1969 | Mason | A61B 3/113 250/206 |
| 4,815,839 A | * | 3/1989 | Waldorf | A61B 3/113 351/210 |
| 5,270,748 A | * | 12/1993 | Katz | G02B 27/0093 351/209 |

(Continued)

FOREIGN PATENT DOCUMENTS

WO   WO-2018000020 A1 *   1/2018   ......... G06K 9/00597

OTHER PUBLICATIONS

Durna et al. "Design of a Binocular Pupil and Gaze Point Detection System Utilizing High Definition Images". Appl. Sci. 2017, 7, 498 . (Year: 2017).*

(Continued)

*Primary Examiner* — Julie Anne Watko
(74) *Attorney, Agent, or Firm* — Fenwick & West LLP (57) ABSTRACT

A time of flight (ToF) eye tracker includes an illumination source configured to emit pulses of light toward a pupil of an eye, wherein the pulses of light are retroreflected by a retina of the eye. The ToF eye tracker also includes a camera assembly configured to detect the retroreflected pulses of light. The ToF eye tracker also includes a controller configured to determine ToF information for one or more of the retroreflected pulses of light, and determine eye tracking information for the user's eye using the determined ToF information and a virtual eye model.

20 Claims, 5 Drawing Sheets

(56) References Cited

U.S. PATENT DOCUMENTS

| | | | | |
|---|---|---|---|---|
| 8,398,239 B2* | 3/2013 | Horning | ............... | G02B 27/017 |
| | | | | 351/209 |
| 9,761,055 B2* | 9/2017 | Miller | ..................... | G06F 3/011 |
| 10,335,572 B1* | 7/2019 | Kumar | ................. | G02B 27/017 |
| 10,379,612 B1* | 8/2019 | Bonnier | .................. | G06F 3/167 |
| 2003/0123027 A1* | 7/2003 | Amir | ...................... | A61B 3/113 |
| | | | | 351/209 |
| 2004/0174496 A1* | 9/2004 | Ji | ........................... | G06F 3/013 |
| | | | | 351/209 |
| 2016/0042221 A1* | 2/2016 | Mei | ...................... | G06K 9/0061 |
| | | | | 382/103 |
| 2017/0115487 A1* | 4/2017 | Travis | ................ | G02B 27/0172 |
| 2017/0139475 A1* | 5/2017 | Eivazi | ..................... | G06F 3/013 |
| 2019/0156100 A1* | 5/2019 | Rougeaux | .......... | G06K 9/00597 |
| 2019/0235248 A1* | 8/2019 | Ollila | ................ | G02B 27/0093 |
| 2019/0236355 A1* | 8/2019 | Ollila | ................... | G06K 9/2036 |

OTHER PUBLICATIONS

Gneo et al. "A free geometry model-independent neural eye-gaze tracking system." Journal of NeuroEngineering and Rehabilitation 2012, 9:82. (Year: 2012).*

Gillstrand, "The Schematic Eye-Unaided and Aided", Visual Optics, H.H. Emsley editor, 3rd ed., pp. 336-348, Butterworth, Scarborough, Ont., 1955. (Year: 1955).*

* cited by examiner

TIME OF FLIGHT BASED EYE TRACKER

BACKGROUND

The present disclosure generally relates to tracking eye movement, and specifically to using time of flight to determine eye tracking information based on a calibrated model of the path of light through a user's eye.

Augmented reality (AR), mixed reality (MR), and virtual reality (VR) systems may receive various input methods, such as input from the user's hands, input devices, and so on. In addition, the AR/MR/VR system may receive input based on eye tracking information, which may indicate, for example, where the user's eye is gazing towards. Such information may be used in a gaze-contingent interface. However, current systems of eye tracking may necessitate complex optical sensors and methods to analyze and detect corneal reflections and other image features captured of the user's eye, which are computationally intensive. Moreover such systems do not provide direct information regarding an eye's accommodation, and instead indirectly infer the eye's accommodation from a determined vergence of the eyes.

SUMMARY

Embodiments disclose a time of flight (ToF) eye tracker that includes an illumination source configured to emit pulses of light toward a pupil of an eye, wherein the pulses of light are retroreflected by a retina of the eye. The ToF eye tracker also includes a camera assembly configured to detect the retroreflected pulses of light. The ToF eye tracker also includes a controller configured to determine ToF information for one or more of the retroreflected pulses of light, and determine eye tracking information for the user's eye using the determined ToF information and a virtual eye model. Additional embodiments disclose a head mounted display. The head mounted display includes a display assembly comprising an optics block and an electronic display panel, the electronic display panel transmitting light through the optics block to a user's eye at an exit pupil of the display assembly. The head mounted display further includes the ToF eye tracker.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

Configuration Overview

A Time of Flight (ToF) eye tracker is described in embodiments within. The ToF eye tracker includes an illumination source to emit pulses of light towards the pupil of a user's eye. Due to the configuration of the retina of a human eye, light rays that enter the eye and reach the retina are retro-reflected, i.e., the angle of reflection of the reflected light ray is the same as the angle of incidence of the incoming light ray. Thus, the pulses of light that enter the user's eye and are incident upon the user's retina are reflected back at the same angle at which they entered the user's eye. These retro-reflected light pulses are captured by a camera assembly. The ToF eye tracker may have a controller that is configured to determine the time of flight of the light pulses that enter the user's eye and are reflected back. These retro-reflected light pulses have a different time of flight compared to light pulses that are incident upon other surfaces in the local environment, such as the cornea, or any other surfaces that do not comprise the pupil of the user's eye. Thus, the ToF eye tracker can determine whether a light pulse has entered the user's eye due to the different time of flight of the light pulses that enter the user's eye. This allows the ToF eye tracker to determine eye tracking information for the user's eye using a virtual eye model, which may store information about the time of flight of light pulses that enter the eye for different orientations of the eye. The virtual eye model may be generated using a calibration process, or received from an external source.

In addition, the ToF eye tracker may also be able to determine an amount of lens accommodation of the user's eye. In in order to clearly view objects a different distances to the user's eye, humans possess a lens accommodation reflex, which allows humans to adjust the thickness of a crystalline lens (henceforth referred to as a lens) within the eye in order to adjust optical power of the lens to allow clear images to be produced of objects at different focal lengths. As the thickness of the lens changes, the time of flight of a light pulse through the eye changes as well, as the phase velocity of the light pulse when travelling through the lens differs from the phase velocity through other media in the eye. Therefore, a change in the thickness of the eye results in a difference in the time of flight. This difference can be used by the ToF eye tracker in order to determine the amount of lens accommodation of the eye, i.e., the thickness of the lens, as well as the convergence of the user's eyes. Additional details regarding this process are described below.

Furthermore, embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world)

content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

Head-Mounted Display Overview

Figure 1A:
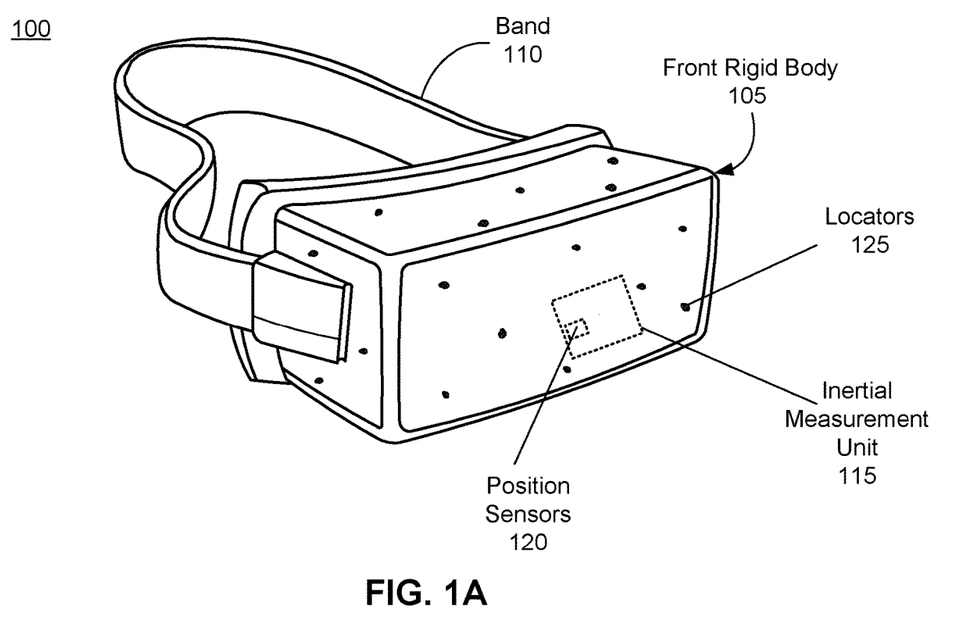
FIG. 1A is a wire diagram of a HMD 100 that includes a ToF eye tracker, in accordance with one or more embodiments.

FIG. 1A is a wire diagram of a HMD 100 that includes a ToF eye tracker, in accordance with one or more embodiments. The HMD 100 includes a front rigid body 105 and a band 110. The front rigid body 105 includes one or more electronic display elements of an electronic display (not shown), an inertial measurement unit (IMU) 115, one or more position sensors 120, and locators 125. In the embodiment shown by FIG. 1A, the position sensors 120 are located within the IMU 115, and neither the IMU 115 nor the position sensors 120 are visible to the user. The IMU 115, the position sensors 120, and the locators 125 are discussed in detail below with regard to FIG. 5. Note in embodiments, where the HMD 100 acts as an AR or MR device, portions of the HMD 100 and its internal components are at least partially transparent.

Figure 1B:
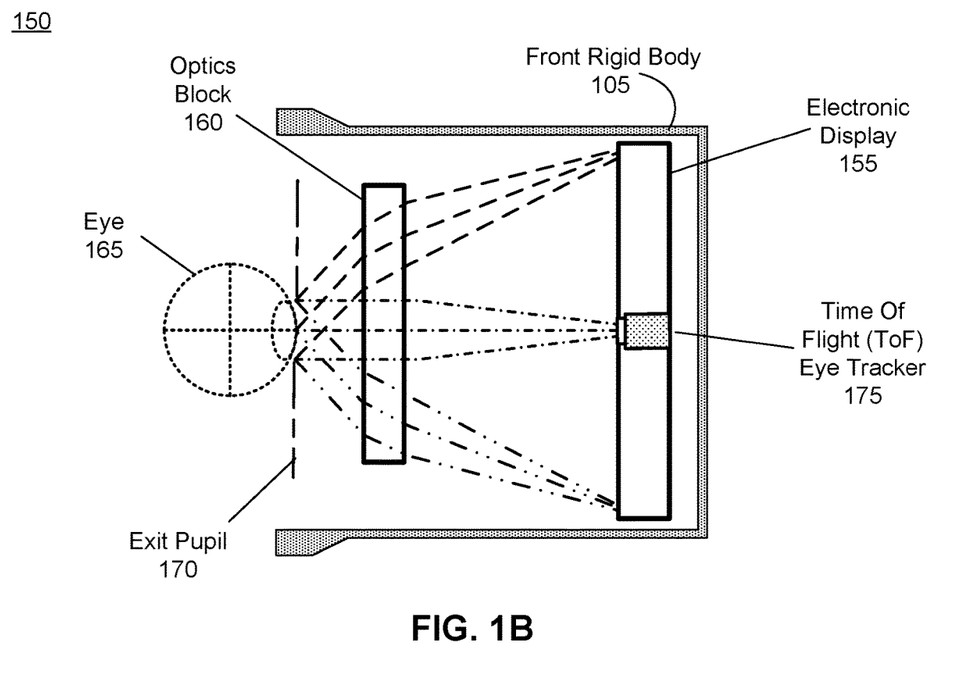
FIG. 1B is a cross section of a front rigid body of the head-mounted display in FIG. 1A, in accordance with one or more embodiments.

FIG. 1B is a cross section 150 of the front rigid body 105 of the HMD 100 shown in FIG. 1A, in accordance with one or more embodiments. As shown in FIG. 1B, the front rigid body 105 includes an electronic display 155 and an optics block 160 that together provide image light to an exit pupil 170. The exit pupil 170 is the location of the front rigid body 105 where a user's eye 165 is positioned. For purposes of illustration, FIG. 1B shows a cross section 150 associated with a single eye 165, but another optics block and electronic display, separate from the optics block 160 and electronic display 155 shown here, provide an altered image light to the other eye of the user.

The electronic display 155 displays images to the user. In various embodiments, the electronic display 155 may comprise a single electronic display or multiple electronic displays (e.g., a display for each eye of a user). Examples of the electronic display 155 include: a liquid crystal display (LCD), an organic light emitting diode (OLED) display, an active-matrix organic light-emitting diode display (AMOLED), a QOLED, a QLED, some other display, or some combination thereof.

The optics block 160 magnifies received light, corrects optical errors associated with the image light, and presents the corrected image light is presented to a user of the HMD 100. An optical element may be an aperture, a Fresnel lens, a convex lens, a concave lens, a filter, or any other suitable optical element that affects the blurred image light. Moreover, the optics block 160 may include combinations of different optical elements. In some embodiments, one or more of the optical elements in the optics block 160 may have one or more coatings, such as anti-reflective coatings.

In some embodiments, magnification of the image light by the optics block 160 allows the electronic display 155 to be physically smaller, weigh less, and consume less power than larger displays. Additionally, magnification may increase a field of view of the displayed media. For example, the field of view of the displayed media is such that the displayed media is presented using almost all (e.g., 110 degrees diagonal), and in some cases all, of the user's field of view. Additionally, in some embodiments, the amount of magnification may be adjusted by adding or removing optical elements.

The optics block 160 may be designed to correct one or more types of optical error. Examples of optical error include: two dimensional optical errors, three dimensional optical errors, or some combination thereof. Two dimensional errors are optical aberrations that occur in two dimensions. Example types of two dimensional errors include: barrel distortion, pincushion distortion, longitudinal chromatic aberration, transverse chromatic aberration, or any other type of two-dimensional optical error. Three dimensional errors are optical errors that occur in three dimensions. Example types of three dimensional errors include spherical aberration, chromatic aberration, field curvature, astigmatism, or any other type of three-dimensional optical error. In some embodiments, content provided to the electronic display 155 for display is pre-distorted, and the optics block 160 corrects the distortion when is receives image light from the electronic display 155 generated based on the content.

In addition, and described with further detail below in reference to FIGS. 2-3B, the HMD 100 also includes a time of flight (ToF) eye tracker 175. The ToF eye tracker 175 includes an illumination source to transmit light pulses to the user's eye 165, a camera assembly to capture the reflected light from the user's eye 165, and a controller to determine eye tracking information using time of flight of the light. Such eye tracking information describes a location or direction where the user is looking at. Examples of eye tracking information may include the eye gaze of the user or the position of the pupil within the user's eye. The ToF eye tracker 175 may be located in front of the electronic display 155, such that it is closer to the user's eye 165 relative to the electronic display 155. In such a case, the ToF eye tracker 175 may be optically transparent. Alternatively, the ToF eye tracker 175 may be placed behind the electronic display 155. In such a case, the electronic display 155 may be optically transparent to allow the light pulses generated by the ToF eye tracker 175 to pass through the electronic display 155 and enter the user's eye 165. In another embodiment (not shown), the ToF eye tracker 175 is placed adjacent to the electronic display 155, instead of in the center of the electronic display 155. The ToF eye tracker 175 may be placed in other locations as well, such as in front of the optics block 160, or it may be located along a plane that is equidistant from both of the user's eyes.

Time of Flight Eye Tracker

Figure 2:
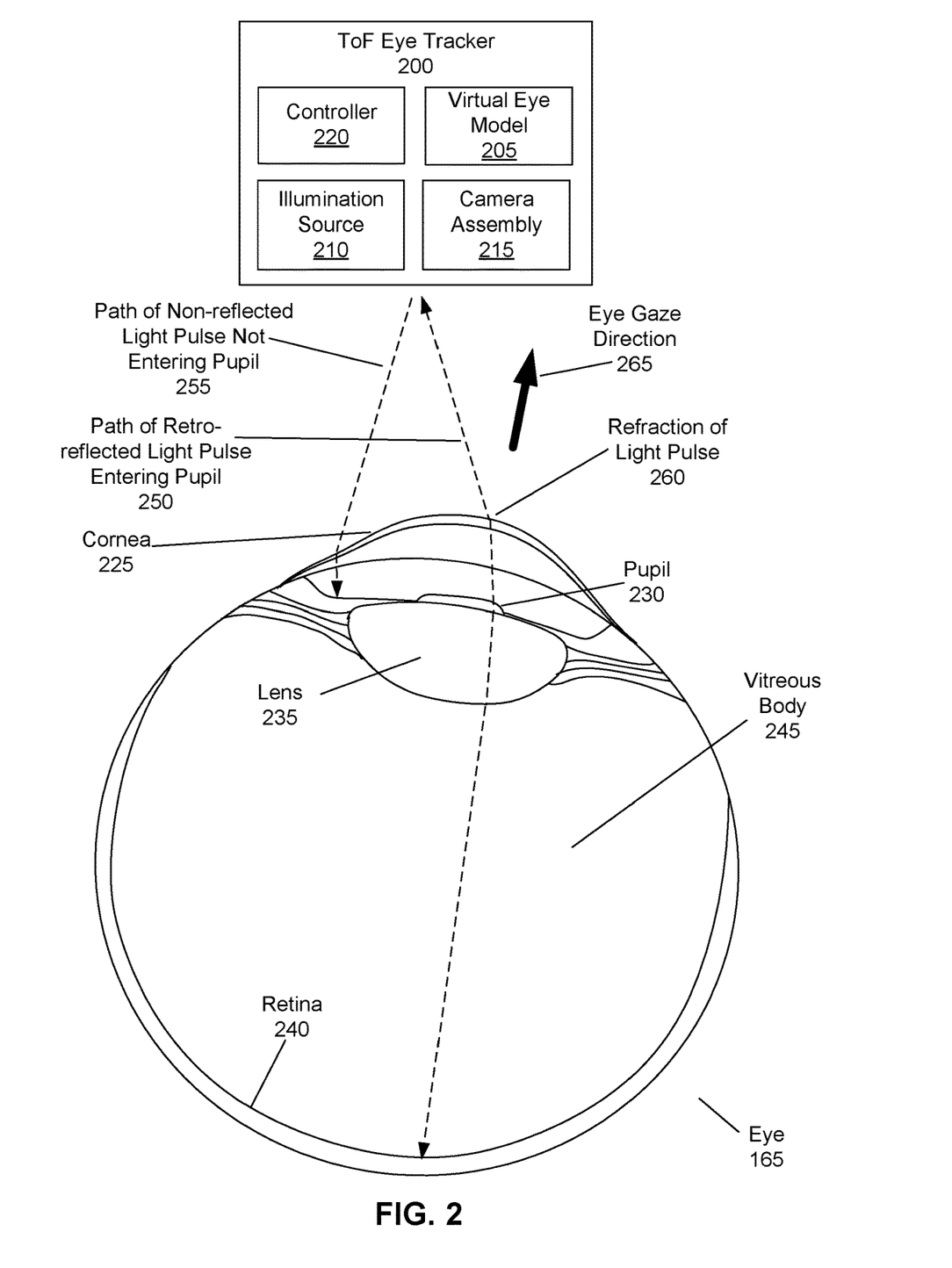
FIG. 2 illustrates a detail view of a mechanism by which the ToF eye tracker of FIG. 1B determines eye tracking information, in accordance with one or more embodiments.

FIG. 2 illustrates a detail view of a mechanism by which the ToF eye tracker 200 determines eye tracking information, in accordance with one or more embodiments. The ToF eye tracker 200 is an eye tracking system that uses time of flight to determine eye tracking information. In some embodiments, the ToF eye tracker 200 may be the ToF eye tracker 175 that is a component of the HMD 100. The ToF eye tracker 200, as illustrated, includes an illumination source 210, a camera assembly 215, a virtual eye model 205, and a controller 220. FIG. 2 also illustrates a cross section of the user's eye 165 to illustrate the path of light 250 through a pupil 230, retro-reflected off a retina 240, and returning to the ToF eye tracker 200.

The illumination source 210 generates pulses of light directed towards the user's eye 165 in accordance with instructions from the controller 220. The illumination source 210 may include one or more light sources, such as light emitting diodes or laser diodes. These light sources emit light pulses for short durations of time (e.g., under 10 nanoseconds). The light emitted may be within the visible spectrum, may be infrared (or other non-visible light), may be at other frequencies, or some combination thereof. The light sources, if more than one is present, may be arranged such that they surround the camera assembly 215. Each light source may emit light at a different frequency. In one embodiment, multiple light sources are arranged concentrically around the camera assembly 215. The light sources of the illumination source 210 may also be able to emit the light pulses at a specific direction. This may be achieved by masking a portion of the output of one or more of the light sources using a mechanical or electronic shutter, such that the light pulses emitted by the unmasked portion are transmitted in a specific direction. Alternatively, only a certain number of the light sources may output light, corresponding to the direction in which the light pulse is to be generated. In another embodiment, the light sources themselves may generate light that exhibit some amount of coherence, such that the light pulses can be focused in one direction. Such light sources may be lasers. In one embodiment, the light sources may be able to individually adjust the intensity of the light pulses that they emit based on the instructions from the controller 220. In one embodiment, the light sources can generate light pulses that are modulated by a carrier frequency, such that the phase shift of the carrier is measured by the camera assembly 215 upon detecting the reflected light in order to determine the time of flight.

The camera assembly 215 detects reflections of light pulses generated by the illumination source 210 in accordance with instructions, which may be received from the controller 220. The camera assembly 215 comprises one or more light capture devices for capturing reflections of the light pulses generated by the illumination source 210. The one or more light capture devices are able to capture images in a frequency band that encompasses the frequency of the light generated by the illumination source 210. In some embodiments, the one or more light capture devices of the camera assembly 215 are configured to filter out frequencies outside this frequency band. In cases where the light sources of the illumination source 210 each emit light of a different frequency band, each light capture device of the camera assembly 215 may be able to capture light from a specific one of these different frequency bands, and filter out light from other frequency bands. Each light capture device is able to detect the light pulses generated by the illumination source 210 and determine a time of flight of the light pulse, in response to instructions from the controller 220.

In one embodiment, each light capture device includes a pair of two photodiodes. Each photodiode in the pair detects light in succession in order to determine a time of flight of a light pulse emitted from the illumination source 210. After a light pulse is emitted by the illumination source 210, a first photodiode of the pair captures light for a first period of time. The first photodiode may begin capturing light at the same time as the start of the light pulse. The first period of time is longer than the duration for which the light pulse is emitted by the illumination source 210, and long enough in duration such that the first photodiode captures at least a portion of the reflected light from the light pulse. Thus, the duration of the first period is selected to be longer than the round trip distance of the light pulse, and thus should be longer than the time taken by light to travel from the illumination source 210 to the retina 240 and back to the camera assembly 215. However, the first period is less than the total duration of time between emission of the light pulse and the end of the reflected light pulse as detected by the camera assembly 215. Subsequent to the end of the first duration, the second photodiode of the pair begins capturing light for a second period of time. This second period of time should extend beyond the end of the light pulse. The result is that the first photodiode captures a portion of the reflected light pulse, and the second photodiode captures the remainder of the light pulse. The computed distance is determined to be:

$$d = \frac{1}{2} c \Delta t \left( \frac{Q_1}{Q_1 + Q_2} \right) \quad (1)$$

Where $c$ is the speed of light, $\Delta t$ is a time duration of the light pulse emitted by the light source, and $Q_1$ and $Q_2$ are the amount of electrical charge accumulated by the first photodiode and the second photodiode during the captures of light in the first and second periods of time, respectively. Note here that the time duration $\Delta t$ of the light pulse should be sufficiently small such that a distance within the range of the round trip distance of the illumination source 210 to the retina 240 can be measured (e.g., if the illumination source is approx. 5 cm from the user's eye, then the pulse width should be within the range of 0.35 nanoseconds).

Although a light capture device with two photodiodes is described here, in other embodiments the light capture device has a single photodiode with two charge storage areas. The photodiode may direct captured light into each or both of the charge storage areas at any time, based on instructions from the controller 220. Each charge storage area functions similarly to each of the two photodiodes in the above description. Instead of having charge accumulate in the separate photodiodes, charge accumulates in the separate charge storage areas instead.

In another embodiment, the light emitted by the illumination source 210 is modulated with a carrier wave (e.g., a sinusoidal or square wave), and this changes the configuration of the camera assembly 215. In such an embodiment, the camera assembly 215 includes multiple photodiodes (e.g., four), and each photodiode takes multiple samples of the reflected light. Each sample is phase stepped by 90 degrees. The phase angle between the emitted and reflected light is computed based on the samples, and the time of flight is computed based on the phase angle.

In one embodiment, the camera assembly 215 further includes an array of light capture devices to determine the direction of the reflected light pulses. These light capture devices may be arranged circularly. In one embodiment, the direction from the center of the array of the light capture array which registers the highest light intensity is the direction of the received light pulse. In another embodiment, the captured light intensity from each light capture device in the array is used to weight the direction for that light capture device from the center of the array, and the weighted averaged of the directions for all the light capture devices is used to determine the direction of the reflected light pulse. The light capture devices may also be arranged hemispherically, in order to more accurately determine the direction of the reflected light pulse.

Using the methods described above, the camera assembly 215 is able to determine a time of flight of a light pulse transmitted to the eye and reflected back to the camera assembly 215 from the retina 240, and in some embodiments, a direction of the reflected light. Methods other than those described here may also be used to determine the time of flight of the emitted light and the direction of the reflected light.

The controller 220 transmits instructions to the illumination source 210 and the camera assembly 215 in order to determine eye tracking information using the time of flight measured by the camera assembly 215 or controller 220 of light retro-reflected from the user's eye 165. The eye tracking information may include the eye gaze direction 265 of the user's eye 165, and/or the position of the eye 165, i.e., its degree of rotation in the eye socket. Details are provided below to describe how time of flight changes based on the position of the user's eye. Additionally, embodiments of determining eye tracking information by the controller 220 using time of flight information are described below.

The time of flight of light pulses directed towards a user's eye changes as the user's eye 165 rotates in its socket. If a portion of the light pulse enters the user's pupil 230, it may eventually reach the retina 240, and be retro-reflected by the retina 240, i.e., the light pulse is reflected in the exact opposite direction of the direction of the incident or incoming light pulse. Hence, the light is reflected back to the ToF eye tracker 200 along a parallel with which it travelled to the retina 240. The round trip path of such a light pulse is shown in FIG. 2 as path 250. The time of flight of a light pulse on such a path 250 differs from light pulses that are not retro-reflected off the retina 240, or which do not enter the eye, such as the light pulse following other paths, such as path 255. In particular, the path 250 passes through various different media in the eye 165, such as the cornea 225, pupil 230, lens 235, vitreous body 245, and so on. Each of these media has a different refractive index, causing refraction, such as refraction 260, of the path 250. Each media also causes the light passing through it to have a different phase velocity. The time of flight a path 250 through the eye can be determined due to knowledge of the refractive index and phase velocity of the various media in the eye 165. Thus, such a path 250 has a different time of flight from the other paths 255. In addition, the retro-reflection of light pulses along paths such as path 250 cause the reflected light that is captured at the ToF eye tracker 200 to be of a larger intensity from light pulses that are reflected from other paths 255, as light that travels along other paths are not perfectly reflected and scatter, causing a lower relative intensity of light to be captured at the ToF eye tracker 200.

In addition to the differences in time of flight between paths entering the eye and those that do not, the total time of flight of a light pulse that is generated by the ToF eye tracker 200 and retro-reflected off the retina 240 changes as the eye 165 moves in the eye socket. This is because as the eye 165 moves, the position of the pupil 230 changes, and thus the distance between the ToF eye tracker 200 and the pupil 230 also changes. In addition, the intensity of the reflected light also changes as the position of the pupil 230 changes, due, for example, to the fact that the angle at which light hits the retina and other elements in the eye 165 changes, causing more light to be reflected elsewhere rather than back along the parallel path to the ToF eye tracker 165. By measuring this total time of flight of light pulses reflected from the user's retina 240, and along with additional information, such as the intensity of the reflected light, the controller 220 is able to determine eye tracking information for the user's eye 165, as described below.

In one embodiment, the controller 220 determines the eye gaze direction 265 of the user's eye 165. The controller 220 may utilize the data from a virtual eye model 205 to determine the eye gaze direction 265. In this process, the controller 220 may instruct the illumination source 210 to generate one or more light pulses, and instruct the camera assembly 215 to capture the reflected light pulses. The controller 220 instructs the camera assembly 215 to compute the time of flight value of the reflected light pulse, or computes the time of flight values at the controller 220. The computation of the time of flight may be performed similar to the method described above for the camera assembly 215. While some of the light from the light pulse may not arrive at the retina 240, but instead hit other portions of the surface of the eye or other areas in the HMD 100, this light may not reflect significantly and scatter, or may not be retro-reflect and thus not have a reflection collected by the camera assembly 215. Therefore, the time of flight that is measured will have a high signal to noise ratio, with the signal being the time of flight of light that travels a path that is retro-reflected off the retina 240. Additional steps may be used to increase the signal to noise ratio, such as instructing the illumination source 210 to generate a light pulse at a frequency that is highly reflected by the retina 240, but which is not readily reflected by surrounding materials. The camera assembly 215 may be instructed filter out all light except light of a frequency that is commonly reflected from the retina 240 (e.g., light in the infrared spectrum). In addition, the time of flight of light that merely hits the eye (e.g., path 255) is different from the time of flight of light that reflects off the retina 240 (e.g., path 255), due to the reasons stated in the above section. Therefore, the controller 220 can further distinguish between light that has entered the pupil 230 and reached the retina 240, versus light that has not. In addition, depending upon the position of the user's eye 165, the time of flight value that is determined can vary. Furthermore, the intensity of the reflected light can also vary based on the position of the user's eye 165.

The controller 220 can instruct the illumination source 210 to transmit multiple light pulses, and instruct the camera assembly 215 to measure time of flight values for multiple differing periods of time following each emitted light pulse (e.g., the periods may be offset by 5 ns from each other). These periods of time correspond to the periods during which the camera assembly 215 measures the $Q_1$ and $Q_2$ charges, as described above with regards to the camera assembly 215. For each period, the controller 220 may determine the intensity of the reflected light (i.e., the amount of charge accumulated). The period with the highest intensity may indicate that the captured light during that period is light that reflected off the retina 240. The controller 220 utilizes this intensity value, along with the time of flight value, and accesses the virtual eye model 205 to determine if these values correspond to an eye gaze direction 265, and optionally, a position of the pupil 230 within the eye socket. A match may be found in the virtual eye model 205 if the measured values are within a threshold amount of stored values in the virtual eye model 205. If a match is found, the controller 220 retrieves the eye gaze direction 265 stored in the virtual eye model 205 for the corresponding measured intensity and/or time of flight values. The controller 220 may transmit this eye gaze direction 265 to an external unit, e.g., a console of the HMD 100.

In one embodiment, the camera assembly 215 includes more than one light capture device. Therefore, two different time of flight values can be determined using each light capture device. This can allow additional accuracy in the determination of the eye tracking information, as the time of flight measured at each light capture device of the camera assembly 215 will differ due to their different positions.

The eye gaze direction 265 may be indicated in the virtual eye model 205 using two values that define positions along two orthogonal axes (e.g., a horizontal and vertical) that determine a plane which intersects all possible eye gaze directions 265 of the user's eye 165. Therefore, a coordinate on the plane will indicate an eye gaze direction 265. If no match is found (within a threshold amount), then the controller 220 determines that the light pulse that has a time of flight measured had not entered the pupil 230 to be reflected off the retina 240, and therefore causes a new light pulse to be generated in order to determine a new time of flight.

The virtual eye model 205 may be received by the controller 220 from an external source. This virtual eye model 205 may be selected from a list of models. The list of models may be categorized by various body measurements, such as age, distance between the eyes, alignment of HMD 100 relative to the eyes, head width at eye level, gender, and other human body measurements that may change the position of the eyes relative to the ToF eye tracker 200 when the ToF eye tracker 200 is positioned in the HMD 100. The controller 220 may transmit a message to a component of the HMD 100, such as a console (e.g., the console 520 of FIG. 5), to request one or more of the body measurements of the user, which may be input by the user using a user interface. After receiving one or more of these body measurement values, the controller 220 retrieves the virtual eye model 205 from the list of models in the external source that most matches the received body measurements. In one embodiment, the virtual eye model 205 is a lookup table. In another embodiment, the virtual eye model 205 includes a three dimensional model of the eye 165.

In one embodiment, the virtual eye model 205 may be modified using additional calibration data after the virtual eye model 205 is retrieved from the external source. To generate the calibration data, the controller 220 may request a calibration routine be executed by a component of the HMD 100, e.g., a console of the HMD 100. This calibration routine may include presenting one or more calibration images (e.g., via the electronic display 155) to the user to instruct the user to gaze at calibration objects (e.g., some icon or graphic) shown at different calibration locations in the calibration images. Once a calibration image is displayed, the controller 220 is notified, and after a set delay time, the controller 220 may instruct the illumination source 210 to generate one or more light pulses using the method described above. The controller 220 also instructs the camera assembly 215 to capture any reflected light pulses. The controller 220 (or camera assembly 215) determines the time of flight of these reflected light pulses. The intensity of each light pulse may also be measured. Based on the assumption that the user is gazing at the calibration object at the calibration location, the controller 220 can store an association of the determined time of flight values with the eye gaze direction 265 indicated by the calibration location of the calibration object in the virtual eye model 205. The eye gaze direction 265 may be stored as the coordinate location of the center of the pixel of the calibration location of the displayed calibration object. One or more of these calibration images are presented, with each having a calibration location a minimum distance from the calibration locations in any of the other calibration images. After gathering the different associations between the eye gaze directions 265 indicated by the calibration locations and the time of flight values for these calibration locations, the controller 220 may further interpolate the remaining eye gaze directions using the gathered data, e.g., via linear interpolation of the calibration locations and the time of flight values, and store these interpolated values in the virtual eye model 205. Thus, the virtual eye model 205 may include a combination of the calibrated data and previously existing data. The calibration images described here may be combined with another user activity of the HMD 100, such that the user may be performing the gaze movements for the calibration routine in a seamless fashion and without significant interruption to the existing user activity. For example, the HMD 100 may be presenting a video game. During the start of the video game, a tutorial or other segment may instruct the user to look at certain game objects on the electronic display 155. These game objects may also serve as the calibration objects in the calibration routine. In another embodiment, the controller 220 does not receive a virtual eye model 205 from the external source, but instead generates the virtual eye model 205 purely from the calibration data.

In other embodiments, the controller 220 may also determine additional information about the eye 165 based on measured time of flight values. For example, the light pulses emitted by the illumination source 210 may also reflect partially from the cornea 225, pupil 230, lens 235, and other surfaces within the eye which form a boundary between media of differing indices of refraction. These partial reflections may be captured by the camera assembly 215, and a time of flight and/or intensity for these partial reflections may be determined by the controller 220. y Although the above description was made primarily in regards to light pulses, other methods of determining time of flight, such as by detecting a change in phase of the light, can also be effective in determining the eye tracking information. Furthermore, although the description above is made primarily with regards to one of the user's eyes, in practice the process may be repeated for the other eye of the user if eye tracking information is desired for both eyes. Light pulses that are transmitted may arrive at both eyes as well. In such a case, the reflected light pulse from both eyes may have a very similar time of flight (due to symmetry), and therefore the measurement process described above would work in the same fashion. Alternatively, multiple time of flight values may be measurable by the system, for light pulses from the two eyes that arrive at different times at the camera assembly 215. In such a case, the process described above is repeated for each eye.

One exemplary advantage of the process described above for determining the eye tracking information is that a complicated image processing algorithm for detecting the iris of a user's eyes is not necessary. This reduces computational complexity. The virtual eye model 205 described above can be a lookup table, which is computationally inexpensive to implement compared to a complex image processing system. The illumination source 210 and camera assembly 215 may be simple photodiodes, which are inexpensive as well.

Determining Lens Accommodation Using Time of Flight Eye Tracker

Figure 3A:
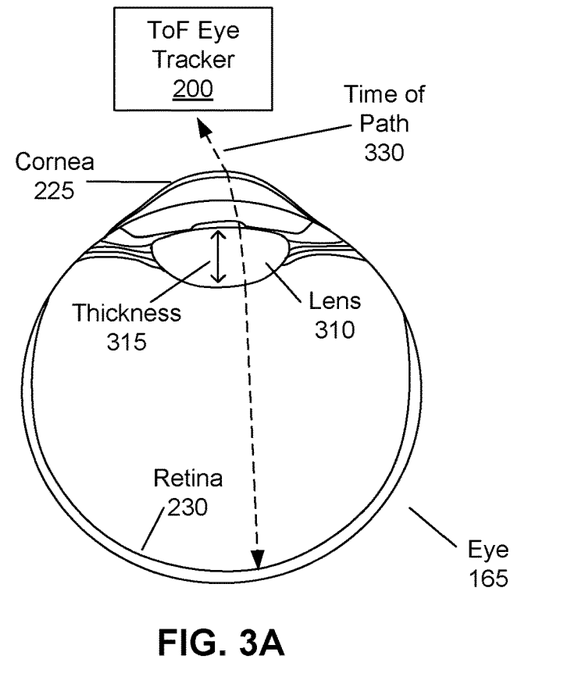
FIG. 3A illustrates an additional improvement on the ToF eye tracker of FIG. 2 for determining an amount of accommodation of a lens of a user's eye, in accordance with one or more embodiments.

FIG. 3A illustrates the ToF eye tracker 200 of FIG. 2 configured to determine an amount of accommodation of a lens of a user's eye, in accordance with one or more embodiments. In one embodiment, the ToF eye tracker 200 can determine an amount of lens accommodation of the user's eye 165 in addition to the eye tracking information described above with respect to FIG. 2. Lens accommodation refers here to the change in optical power of a crystalline lens 310 ("lens 310") of the user's eye 165 in order to bring objects of varying distances from the user into clear focus. Lens accommodation is achieved by the change in the shape of the lens 310 in the eye 165 via various muscles in the eye. A longer and thinner lens results in a longer focal length, while a shorter and thicker lens results in a shorter focal distance. The amount of lens accommodation refers to the thickness of the lens in the eye 165. In FIG. 3A, the lens 310 has a thickness 315. Therefore, the path 330 of light through the eye 165 has a particular time of flight due to the thickness 315.

Figure 3B:
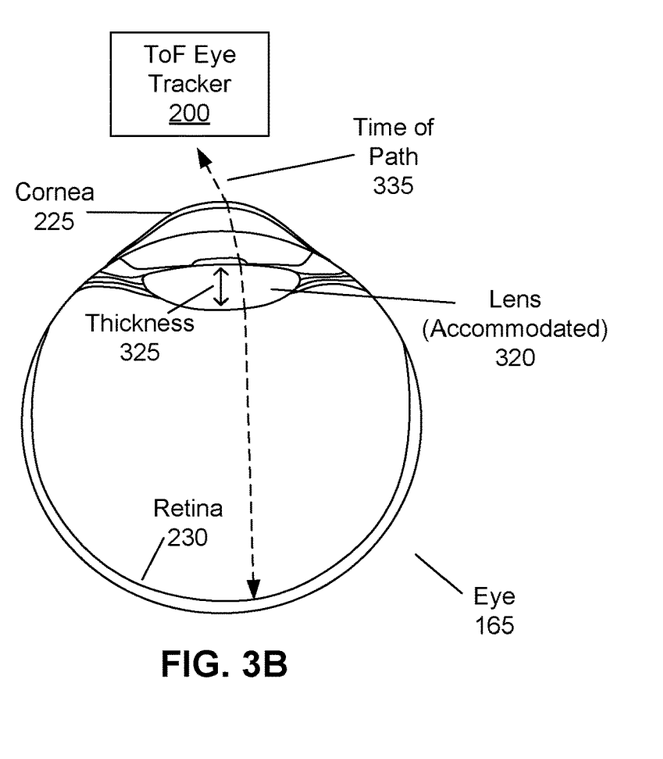
FIG. 3B illustrates the ToF eye tracker of FIG. 3A to determine an amount of lens accommodation where the shape of the lens has changed, in accordance with one or more embodiments.

FIG. 3B illustrates the ToF eye tracker 200 of FIG. 3A with a lens 320 of the eye 165 of a different thickness 325, according to an embodiment. The lens 320 in FIG. 3B has undergone an amount of lens accommodation, and thus has a thickness 325. In this case, the thickness 325 of the lens 320 is reduced from the thickness 315 of the lens 310 in FIG. 3A. This will result in a difference in the time of flight of light through the eye 165, although this difference may be small relative to the overall time of flight of the light. As the time of flight differs depending upon the amount of lens accommodation, the controller 220 can measure this change the time of flight, and therefore infer an amount of lens accommodation. In order to determine the amount of the lens accommodation, the ToF eye tracker 200 may include, as part of the virtual eye model 205, additional data indicating a time of flight for various amounts of lens accommodation of the user's eye 165. The virtual eye model 205 may indicate how much the time of flight value is expected to deviate for various amounts of lens accommodation. For those amounts of lens accommodation without an indicated deviation amount, the controller 220 may interpolate the deviation amount from neighboring values. This data may be included in the virtual eye model 205 that is retrieved from the external source or it may be generated using a calibration process. For the calibration process, the controller 220 may request the HMD 100100 to display objects at different focal distances. This may be achieved by varying the depth at which objects appear to the user by changing the position and other aspects with which the object is displayed to both eyes of the user, using various stereoscopy techniques. For example, the distance between the optics block 160 and the electronic display 155 may be varied in order to adjust the focal distance. Such a varifocal system is described in more detail below with regards to FIG. 5. The user is requested to focus on the object, which causes the user's lens to accommodate to the proper focal length for the object. As the virtual distance of the object is known, the focal length is thus known, and the controller 220 can measure a time of flight, using the methods described above with reference to FIG. 2, for that focal length. The focal length can be considered an amount of lens accommodation, and thus the controller 220 stores within the virtual eye model 205 a correspondence between a measured time of flight and the amount of lens accommodation.

By determining the amount of lens accommodation, the HMD 100 system may know whether a user is properly focused on a displayed object. The HMD may also be able to adjust the image plane presented on the electronic displays 155 for both eyes such that the presented content avoids the vergence-accommodation effect. The HMD 100 may also be used to measure a user's lens accommodation range to determine if the user suffers from any myopia or other issue with focusing light in the eye.

Exemplary Flow

Figure 4:
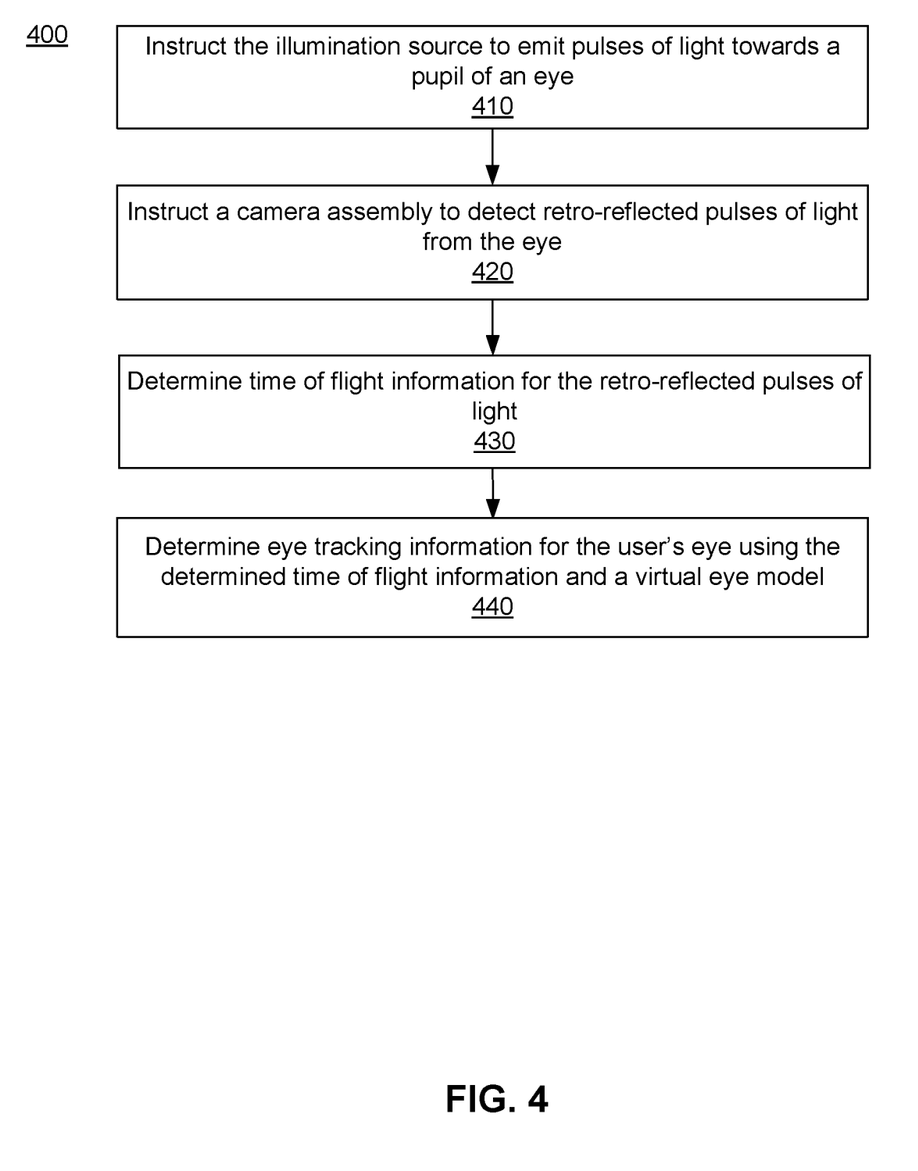
FIG. 4 is a process for using time of flight to determine eye tracking information based on a calibrated model of the path of light through a user's eye, in accordance with one or more embodiments.

FIG. 4 is a process for using time of flight to determine eye tracking information based on a calibrated model of the path of light through a user's eye, in accordance with one or more embodiments. The process of FIG. 4 may be performed by the controller 220 of the ToF eye tracker 200. Other entities may perform some or all of the steps of the process in other embodiments. Likewise, embodiments may include different and/or additional steps, or perform the steps in different orders.

The controller 220 instructs 410 the illumination source 210 to emit pulses of light towards a pupil of an eye. As noted above, the illumination source 210 may include more than one light source to facilitate the determination of the eye tracking information in two dimensions.

The controller 220 also instructs 420 the camera assembly 215 to detect retro-reflected pulses of light from the eye. Portions of the light pulses from the illumination source 210 enter the user's eye 165, and these are retro-reflected off the eye's retina 240 back to the camera assembly 215.

The controller 220 determines 430 time of flight information for the retro-reflected pulses of light. As noted above, the time of flight information may include one or more measured time of flight values for the light pulses.

The controller 220 determines 440 eye tracking information for the user's eye using the determined time of flight information and a virtual eye model. As noted above, the controller 220 may input the time of flight information into the virtual eye model in order to determine an eye tracking information, such as the eye gaze direction or the position of the pupil in the eye.

System Overview

Figure 5:
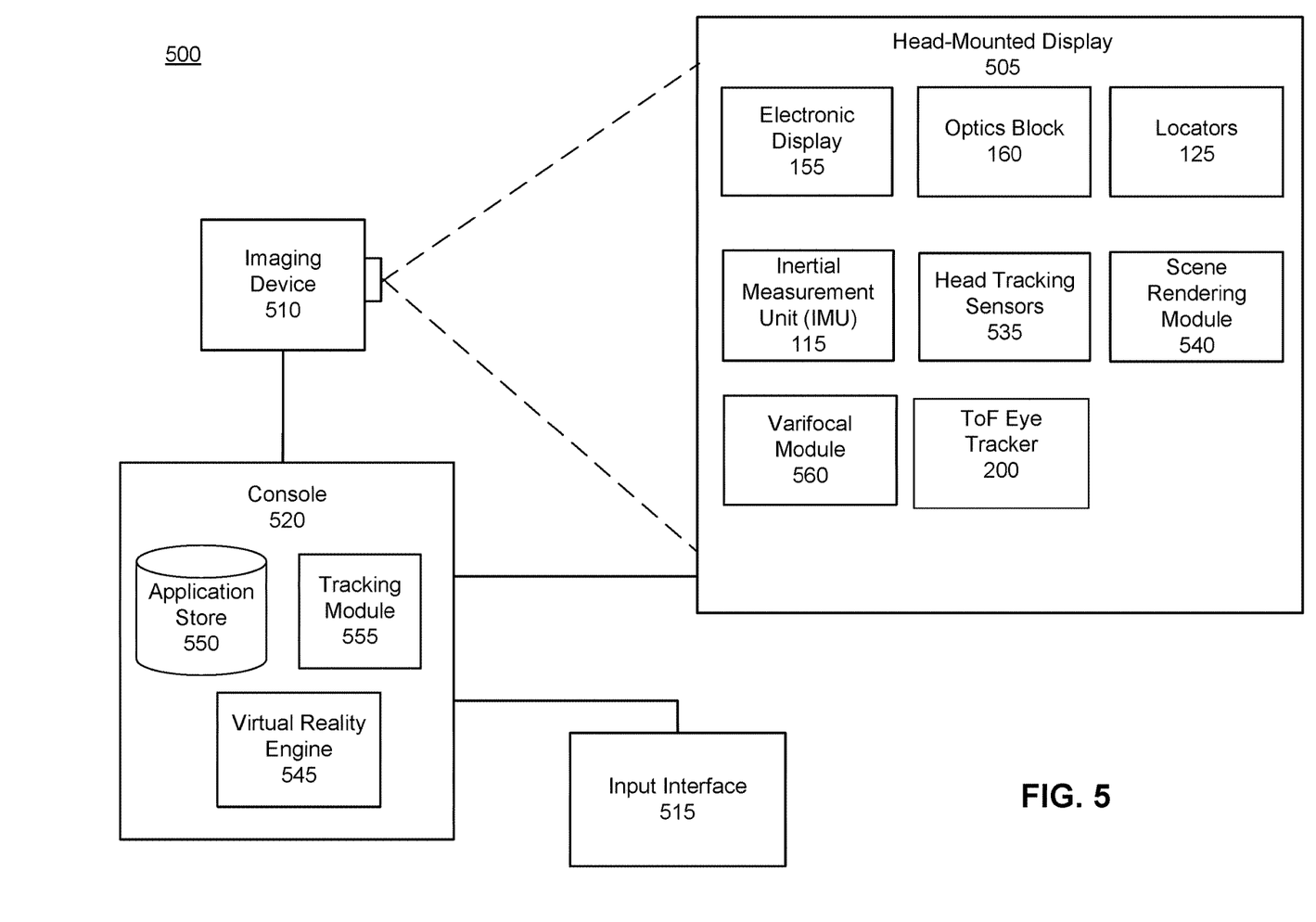
FIG. 5 is system in which a HMD having a ToF eye tracker operates, in accordance with one or more embodiments.

FIG. 5 is system 500 in which an HMD 505 having a ToF eye tracker 200 operates, in accordance with one or more embodiments. The system 500 may be for use as an artificial reality system. In this example, the system 500 includes a HMD 505, an imaging device 510, and an input interface 515, which are each coupled to a console 520. While FIG. 5 shows a single HMD 505, a single imaging device 510, and a single input interface 515, in other embodiments, any number of these components may be included in the system. For example, there may be multiple HMDs 505 each having an associated input interface 515 and being monitored by one or more imaging devices 460, with each HMD 505, input interface 515, and imaging devices 460 communicating with the console 520. In alternative configurations, different and/or additional components may also be included in the multifocal system 500. The HMD 505 may act as a VR, AR, and/or a MR HMD. An MR and/or AR HMD augments views of a physical, real-world environment with computer-generated elements (e.g., images, video, sound, etc.).

The HMD 505 presents content to a user. In some embodiments, the HMD 505 is an embodiment of the HMD 100 described above with reference to FIGS. 1A and 1B. Example content includes images, video, audio, or some combination thereof. Audio content may be presented via a separate device (e.g., speakers and/or headphones) external to the HMD 505 that receives audio information from the HMD 505, the console 520, or both. The HMD 505 includes an electronic display 155 (described above with reference to FIG. 1B), an optics block 160 (described above with reference to FIG. 1B), one or more locators 125, an internal measurement unit (IMU) 115, head tracking sensors 535, a scene rendering module 540, and the ToF eye tracker 200 (described above with reference to FIG. 2 and FIG. 3A-3B).

As noted above with reference to FIG. 2 and FIG. 3A-3B, the ToF eye tracker 200 uses time of flight to determine eye tracking information for the user's eye. The eye tracking information may include an eye gaze direction of the user's eye or a position of the user's eye. The ToF eye tracker 200 includes an illumination source, camera assembly, controller, and virtual eye model. The illumination source includes one or more light sources that transmit light pulses towards the user. Some portion of these light pulses enter the user's eye and are retro-reflected off the retina of the user's eye. These reflected light pulses have a different time of flight due to having entered the eye, and can be distinguished from light pulses that do not reflect from the retina. Furthermore, because light is retro-reflected from the retina, the reflected light is of a stronger intensity than other reflected light. Further, by using a virtual eye model which stores the time of flight information about light pulses entering the eye, the ToF eye tracker 200 may use the time of flight information to determine an eye gaze information of the user's eye or a position of the user's eye. This eye tracking information may be used to determine the gaze point in a virtual scene presented by the HMD 505 where the user is looking.

The locators 125 are objects located in specific positions on the HMD 505 relative to one another and relative to a specific reference point on the HMD 505. A locator 125 may be a light emitting diode (LED), a corner cube reflector, a reflective marker, a type of light source that contrasts with an environment in which the HMD 505 operates, or some combination thereof. Active locators 125 (i.e., an LED or other type of light emitting device) may emit light in the visible band (~380 nm to 550 nm), in the infrared (IR) band (~550 nm to 1 mm), in the ultraviolet band (10 nm to 380 nm), some other portion of the electromagnetic spectrum, or some combination thereof.

The locators 125 can be located beneath an outer surface of the HMD 505, which is transparent to the wavelengths of light emitted or reflected by the locators 125 or is thin enough not to substantially attenuate the wavelengths of light emitted or reflected by the locators 125. Further, the outer surface or other portions of the HMD 505 can be opaque in the visible band of wavelengths of light. Thus, the locators 125 may emit light in the IR band while under an outer surface of the HMD 505 that is transparent in the IR band but opaque in the visible band.

The IMU 115 is an electronic device that generates IMU data based on measurement signals received from one or more of the head tracking sensors 535, which generate one or more measurement signals in response to motion of HMD 505. Examples of the head tracking sensors 535 include accelerometers, gyroscopes, magnetometers, other sensors suitable for detecting motion, correcting error associated with the IMU 115, or some combination thereof. The head tracking sensors 535 may be located external to the IMU 115, internal to the IMU 115, or some combination thereof.

Based on the measurement signals from the head tracking sensors 535, the IMU 115 generates IMU data indicating an estimated position of the HMD 505 relative to an initial position of the HMD 505. For example, the head tracking sensors 535 include multiple accelerometers to measure translational motion (forward/back, up/down, left/right) and multiple gyroscopes to measure rotational motion (e.g., pitch, yaw, and roll). The IMU 115 can, for example, rapidly sample the measurement signals and calculate the estimated position of the HMD 505 from the sampled data. For example, the IMU 115 integrates measurement signals received from the accelerometers over time to estimate a velocity vector and integrates the velocity vector over time to determine an estimated position of a reference point on the HMD 505. The reference point is a point that may be used to describe the position of the HMD 505. While the reference point may generally be defined as a point in space, in various embodiments, a reference point is defined as a point within the HMD 505. Alternatively, the IMU 115 provides the sampled measurement signals to the console 520, which determines the IMU data.

The IMU 115 can additionally receive one or more calibration parameters from the console 520. As further discussed below, the one or more calibration parameters are used to maintain tracking of the HMD 505. Based on a received calibration parameter, the IMU 115 may adjust one or more of the IMU parameters (e.g., sample rate). In some embodiments, certain calibration parameters cause the IMU 115 to update an initial position of the reference point to correspond to a next calibrated position of the reference point. Updating the initial position of the reference point as the next calibrated position of the reference point helps reduce accumulated error associated with determining the estimated position. The accumulated error, also referred to as drift error, causes the estimated position of the reference point to "drift" away from the actual position of the reference point over time.

The scene rendering module 540 receives content for the virtual scene from a VR engine 545 and provides the content for display on the electronic display 155. Additionally, the scene rendering module 540 can adjust the content based on information from the ToF eye tracker 200, the IMU 215, and the head tracking sensors 535.

The imaging device 510 generates image data in accordance with calibration parameters received from the console 520. Image data includes one or more images showing observed positions of the locators 125 that are detectable by imaging device 510. The imaging device 510 may include one or more cameras, one or more video cameras, other devices capable of capturing images including one or more locators 125, or some combination thereof. Additionally, the imaging device 510 may include one or more filters (e.g., for increasing signal to noise ratio). The imaging device 510 is configured to detect light emitted or reflected from the locators 125 in a field of view of the imaging device 510. In embodiments where the locators 125 include passive elements (e.g., a retroreflector), the imaging device 510 may include a light source that illuminates some or all of the locators 125, which retro-reflect the light towards the light source in the imaging device 510. Image data is communicated from the imaging device 510 to the console 520, and the imaging device 510 receives one or more calibration parameters from the console 520 to adjust one or more imaging parameters (e.g., focal length, focus, frame rate, ISO, sensor temperature, shutter speed, aperture, etc.).

The input interface 515 is a device that allows a user to send action requests to the console 520. An action request is a request to perform a particular action. For example, an action request may be to start or end an application or to perform a particular action within the application. The input interface 515 may include one or more input devices. Example input devices include a keyboard, a mouse, a game controller, or any other suitable device for receiving action requests and communicating the received action requests to the console 520. An action request received by the input interface 515 is communicated to the console 520, which performs an action corresponding to the action request. In some embodiments, the input interface 515 may provide haptic feedback to the user in accordance with instructions received from the console 520. For example, haptic feedback is provided by the input interface 515 when an action request is received, or the console 520 communicates instructions to the input interface 515 causing the input interface 515 to generate haptic feedback when the console 520 performs an action.

The console 520 provides content to the HMD 505 for presentation to the user in accordance with information received from the imaging device 510, the HMD 505, or the input interface 515. In the example shown in FIG. 5, the console 520 includes an application store 550, a tracking module 555, and the VR engine 545. Some embodiments of the console 520 have different or additional modules than those described in conjunction with FIG. 5. Similarly, the functions further described below may be distributed among components of the console 520 in a different manner than is described here.

The application store 550 stores one or more applications for execution by the console 520. An application is a group of instructions, that when executed by a processor, generates content for presentation to the user. Content generated by an application may be in response to inputs received from the user via movement of the HMD 505 or the input interface 515. Examples of applications include gaming applications, conferencing applications, video playback application, or other suitable applications.

The tracking module 555 calibrates the system 500 using one or more calibration parameters and may adjust one or more calibration parameters to reduce error in determining position of the HMD 505. For example, the tracking module 555 adjusts the focus of the imaging device 510 to obtain a more accurate position for observed locators 125 on the HMD 505. Moreover, calibration performed by the tracking module 555 also accounts for information received from the IMU 215. Additionally, if tracking of the HMD 505 is lost (e.g., imaging device 510 loses line of sight of at least a threshold number of locators 125), the tracking module 555 re-calibrates some or all of the system 500 components.

Additionally, the tracking module 555 tracks the movement of the HMD 505 using slow calibration information from the imaging device 510 and determines positions of a reference point on the HMD 505 using observed locators from the slow calibration information and a model of the HMD 505. The tracking module 555 also determines positions of the reference point on the HMD 505 using position information from the fast calibration information from the IMU 215 on the HMD 505. Additionally, the tracking module 555 may use portions of the fast calibration information, the slow calibration information, or some combination thereof, to predict a future location of the HMD 505, which is provided to the VR engine 545.

The VR engine 545 executes applications within the system 500 and receives position information, acceleration information, velocity information, predicted future positions, or some combination thereof for the HMD 505 from the tracking module 555. Based on the received information, the VR engine 545 determines content to provide to the HMD 505 for presentation to the user, such as a virtual scene, one or more virtual objects to overlay onto a real world scene, etc.

The VR engine 545 may also perform an action within an application executing on the console 520 in response to an action request received from the input interface 515 and provides feedback to the user that the action was performed. The provided feedback may be visual or audible feedback via the HMD 505 or haptic feedback via VR input interface 515.

In one embodiment the VR engine 545 receives eye tracking information from the ToF eye tracker 200 and may use this information in a variety of applications. In one application, the VR engine 545 may use the eye tracking information in a gaze-contingent interface, which uses a user's gaze as an interface mechanism, instead of other means, such as with a controller, e.g., via the input interface 515.

In another application, the eye tracking information may be utilized for foveated rendering. In the human eye, the fovea, which is a small central pit located at the center of the retina, has a higher concentration of cones compared to other regions of the eye (e.g., the peripheral area). Therefore, the imaging resolution of the eye of light sensed at the fovea is higher than at other regions of the retina. The human brain composes data sensed from the higher resolution foveal region with data sensed from other regions of the retina in order to produce a perceived image that has higher resolution relative to the resolution in the non-foveal regions of the eye. However, this does mean that VR engine 545 may only need to render a higher resolution image at the location of the electronic display 155 where image light from that location will hit the foveal region of the user's eye. For clarity of description, this region of the electronic display 155 may be referred to as the foveal region of the display. As image light produced by the non-foveal regions of the electronic display 155 will hit the non-foveal regions of the eye, the computing resources used to render these non-foveal regions may be reduced without suffering a perceived loss of quality by the user, as the non-foveal regions of the eye cannot perceive the difference in quality.

In order to determine where the foveal region of the electronic display 155 should be at any moment, the VR engine 545 may receive the eye tracking information from the ToF eye tracker 200 in order to determine the direction of the user's eye gaze, and therefore, which parts of the electronic display 155 have light that is focused on the foveal region of the eye. The VR engine 545 may generate a higher quality image for the electronic display 155 at location of the electronic display determined to be the foveal region, and a lower quality image in the non-foveal regions. As used here, the quality of the image refers to the amount of computing resources used to generate the image, and may correspond to the resolution of the image, rendering quality of the image, and so on.

The varifocal module 560 adjusts the focal distance of images presented to the user by the electronic display 155 based on the eye tracking information from the ToF eye tracker 200. The varifocal module 560 can be coupled to the ToF eye tracker 200 to obtain eye tracking information. The varifocal module 560 is configured to adjust focus of one or more images displayed on the electronic display 155, based at least in part on the determined eye tracking information obtained from the ToF eye tracker 200. The varifocal module 560 can also be configured to compensate for a difference between an optical prescription of the user wearing the HMD 405 and the optical characteristic of the front optical element of the optics block 160 to provide the optical correction to the image light emitted from the electronic display 155 towards the user's eye. The varifocal module 560 can also prompt the user to replace the front optical element, if the front optical element being used within the optics block 160 does not provide enough optical power in view of varifocal capability of the HMD system 505 to correct for the user's optical prescription. In an embodiment, the varifocal module 560 can be configured in this case to suggest a correct front optical element to use.

The varifocal module 560 can be interfaced (e.g., either mechanically or electrically) with at least one of the electronic display 155 and optical element(s) of the optics block 160. The varifocal module 560 adjusts focus of the one or more images displayed on the electronic display 155 by adjusting position of at least one of the electronic display 155 and optical element(s) of the optics block 160, based on the determined eye tracking information obtained from the ToF eye tracker 200. By adjusting the focus of the displayed images, the varifocal module 560 varies focus of image light output from the electronic display 425 towards the user's eye. This may be used in order to avoid vergence-accommodation conflicts. When focusing on objects of different distances, a person's eyes will not have parallel gazes staring straight forward, but instead the gaze of each eye will be aimed towards the object. This is called vergence. Therefore, when viewing objects in the real world, the human brain expects a certain degree of vergence for an object at a certain focal distance. However, the images produced by the HMD 505 may not take this effect into consideration, and display objects which have a mismatch in the focal distance of the object, compared to the degree of vergence needed for both eyes to look at the object. However, by being able to receive eye tracking information from the ToF eye tracker 200, the varifocal module 560 can adjust the focal distance of an object, using the methods described above, in order to match the degree of vergence determined by the ToF eye tracker 200.

Additional Configuration Information

The foregoing description of the embodiments of the disclosure have been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A time of flight (ToF) eye tracker comprising:
an illumination source configured to emit pulses of light toward a pupil of an eye, wherein the pulses of light are retroreflected by a retina of the eye;
a camera assembly configured to detect the retroreflected pulses of light;
a controller configured to:
determine ToF information for one or more of the retroreflected pulses of light, and
determine eye tracking information for the user's eye from the determined ToF information and a virtual eye model, the virtual eye model indicating an eye orientation for a determined ToF information.

2. The ToF eye tracker of claim 1, wherein the camera assembly includes a plurality of photodiodes, and controller is further configured to:
cause a first photodiode of the plurality of photodiodes to detect light from the one or more of the retroreflected pulses of light for a first period of time, the first period of time non-congruent with a pulse duration of corresponding emitted pulses of light;
cause a second photodiode of the plurality of photodiodes to detect light from the one or more of the retroreflected pulses of light for a second period of time, a start of the second period of time later than a start time of the first period of time; and
determine, as the ToF information, a time of flight value based on the pulse duration of the one of the emitted pulses of light and a ratio between an amount of light collected by the second photodiode and an amount of light collected by both the first photodiode and the second photodiode.

3. The ToF eye tracker of claim 1, wherein the eye tracking information includes a position of the eye, the position of the eye indicating an orientation of the eye.

4. The ToF eye tracker of claim 1, wherein the virtual eye model is downloaded from a remote server and further calibrated using detected characteristics of the user's eye.

5. The ToF eye tracker of claim 1, wherein the controller is further configured to:
execute a series of calibration steps for the user's eye, the calibration steps measuring calibration ToF information of pulses of light passing through the user's eye for preselected positions of the user's eye; and
generate the virtual eye model for the user's eye using the calibration ToF information.

6. The ToF eye tracker of claim 1, wherein the virtual eye model stores data indicating time of flight of light through different transmission media within the user's eye and at different angles of incidence.

7. The ToF eye tracker of claim 6, wherein the data is stored as one of a three dimensional model or a lookup table.

8. The ToF eye tracker of claim 1, wherein the controller is further configured to:
   update the virtual eye model to include calibration data measuring states of lens accommodation of the user's eye; and
   determine a state of lens accommodation of the user's eye based on the virtual eye model.

9. The ToF eye tracker of claim 1, wherein the virtual eye model stores data indicating a phase change of light passing through different transmission media within the user's eye.

10. The ToF eye tracker of claim 1, wherein the illumination source is adjacent to the camera assembly.

11. A head mounted display (HMD), comprising:
   a display assembly comprising an optics block and an electronic display panel, the electronic display panel transmitting light through the optics block to a user's eye at an exit pupil of the display assembly;
   a time of flight (ToF) eye tracker comprising:
      an illumination source configured to emit pulses of light toward a pupil of an eye, wherein the pulses of light are retroreflected by a retina of the eye;
      a camera assembly configured to detect the retroreflected pulses of light; and
      a controller configured to:
         determine ToF information for one or more of the retroreflected pulses of light, and
         determine eye tracking information for the user's eye from the determined ToF information and a virtual eye model, the virtual eye model indicating an eye orientation for a determined ToF information.

12. The HMD of claim 11, wherein the camera assembly includes a plurality of photodiodes, and controller is further configured to:
   cause a first photodiode of the plurality of photodiodes to detect light from the one or more of the retroreflected pulses of light for a first period of time, the first period of time non-congruent with a pulse duration of corresponding emitted pulses of light;
   cause a second photodiode of the plurality of photodiodes to detect light from the one or more of the retroreflected pulses of light for a second period of time, a start of the second period of time later than a start time of the first period of time; and
   determine, as the ToF information, a time of flight value based on the pulse duration of the one of the emitted pulses of light and a ratio between an amount of light collected by the second photodiode and an amount of light collected by both the first photodiode and the second photodiode.

13. The HMD of claim 11, wherein the eye tracking information includes a position of the eye, the position of the eye indicating an orientation of the eye.

14. The HMD of claim 11, wherein the virtual eye model is downloaded from a remote server and further calibrated using detected characteristics of the user's eye.

15. The HMD of claim 11, wherein the controller is further configured to:
   execute a series of calibration steps for the user's eye, the calibration steps measuring calibration ToF information of pulses of light passing through the user's eye for preselected positions of the user's eye; and
   generate the virtual eye model for the user's eye using the calibration ToF information.

16. The HMD of claim 11, wherein the virtual eye model stores data indicating time of flight of light through different transmission media within the user's eye and at different angles of incidence.

17. The HMD of claim 16, wherein the data is stored as one of a three dimensional model or a lookup table.

18. The HMD of claim 11, wherein the controller is further configured to:
   update the virtual eye model to include calibration data measuring states of lens accommodation of the user's eye; and
   determine a state of lens accommodation of the user's eye based on the virtual eye model.

19. The HMD of claim 11, wherein the virtual eye model stores data indicating a phase change of light passing through different transmission media within the user's eye.

20. The HMD of claim 11, wherein the illumination source is adjacent to the camera assembly.

* * * * *